ized Mar. 28, 1961

2,977,375
PROCESS OF MANUFACTURING N-SULPHANILYL UREAS

Erich Haack, Heidelberg, and Adolf Hagedorn, Mannheim-Waldhof, Germany, assignors to C. F. Boehringer & Soehne, G.m.b.H., Mannheim-Waldhof, Germany No Drawing. Filed Feb. 3, 1954, Ser. No. 408,031

Claims priority, application Germany Feb. 11, 1953

4 Claims. (Cl. 260—397.7)

It is known that N-sulphonyl ureas of the general formula

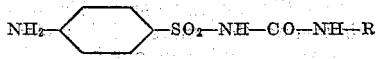

wherein the substituent R is hydrogen or an alkyl, aryl, aralkyl or heterocyclic residue, which may be substituted and may also contain double or triple bonds, are valuable members of the sulphonamide series. The compounds posssess great effects against gram-positive and gram-negative pathogenic bacteria. At the same time they have a relatively good compatibility with the human and animal organism because of their special constitution as urea derivatives, the grade of this compatibility depending on the number of the carbon atoms and on the more or less hydrophilic or lipophilic nature, respectively, of the substituent R (as it is the same with their other physiological and therapeutic qualities). As a measure may serve the blood-level, in which still no disturbing symptoms arise. In this respect most of the derivates of this group show a favorable behavior; therefore, the sulphonamides of the above designed formula possess a considerable importance in medicine, a high blood-level being important for most of the relevant diseases. However, as it is known to those skilled in the art, N-sulphonyl ureas are rather difficultly to be prepared in a good yield.

The usual manner of preparing sulphonamides, namely by reaction between urea or its derivatives, respectively, and sulphonyl chloride is not practicable in this case, products of polymerisation resulting rather than the desired N-sulphanilyl ureas. Therefore a number of other processes for technical use has been worked out hitherto; as a matter of fact they all have, nevertheless, various handicaps:

(1)
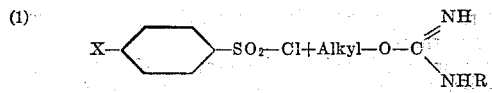

(X here and following=NH₂ or a group convertible to NH₂)

The method of reacting sulphanil acid derivatives, for instance sulphanilyl chloride, with the correspondent isourea ether is very unsatisfactory, because the intermediate sulphanilyl isourea ethers are very sensitive substances, which, by splitting off an alcoholic radical, may easily change to cyanamide derivatives or their products of decomposition. As the transformation to the sulphanilyl ureas by concentrated hydrochlorid acid, the performance of which being per se technically difficult, is also accompanied by a strong decomposition, the yields obtained by this method are indeed very low.

(2)
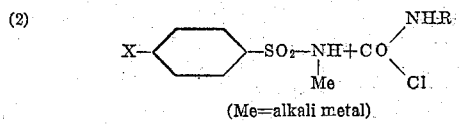
(Me=alkali metal)

The reaction between the alkali salts of sulphonamides and carbamic acid chlorides is not suitable for a large scale manufacturing of N-sulphanilyl ureas because the production and the employment of carbamic acid chlorides, being very irritable substances, are technically not very favorable.

(3)
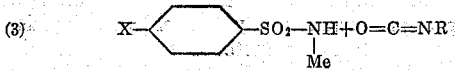

The method of preparing N-sulphanilyl ureas by the reaction of isocyanates with the alkali salts of sulphonamide is doubtless of technical importance, in so far as the higher and aromatic members of the series are concerned, the correspondent isocyanic acid esters being rather easily available and manageable. But this is not the case with the lower aliphatic isocyanic acid esters; therefore the method (3) is not the appropriate basis for the production of the important N-sulphanilyl alkyl ureas.

(4)
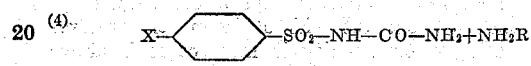

Furthermore, it has been proposed reacting sulphanilyl urea (prepared from sulphonamide and salts of cyanic acid or according to another of the foregoing mentioned methods) with primary amines NH₂R in a manner analogous to the reaction between urea and amines for the preparing of substituted ureas. This reaction has several disadvantages: N-sulphanilyl ureas are rather strong acids, which are apt to fix the amine to be converted as a salt. However, the salts of N-sulphanilyl ureas react rather difficultly being stable forms of said compounds. Moreover, they have the tendency to decompose in an undesired manner, i.e. to salts of the cyanic acid and to sulphonamide. In so far as the desired reaction may take place, namely ammonia being set free, one does not obtain clear results, the ammonia itself reacting in competition with the amines to be converted; thus difficultly separable reaction mixtures are obtained. Therefore, this procedure is practicable in special cases only, for example aromatic amines; it fails in so far as lower aliphatic amines are concerned.

(5)
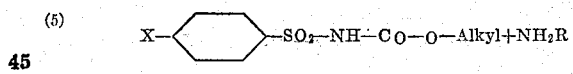

The reaction between amines NH₂R and sulphanilyl urethanes (the latter being easily available from sulphanilyl chloride and urethanes) is fundamentally better than (4): as it is well known, the amine salts of these sulphanilyl urethanes do not decompose to salts of cyanic acid in the aforesaid undesired manner; on the other hand, an alcohol is obtained during the further reaction, the latter being in competition with the amine, it is true, but it may be separated easily therefrom. However, also the procedure (5), as it has been carried out hitherto, comprises several disadvantages: Whereas some amines, for instance aromatic amines, react relatively easily being rather weak bases (thus the urethanes being set free for the desired reaction), the strongly basic aliphatic amines form stable and neutral salts with N-sulphanilyl urethanes, thus stabilizing the molecule. In this case, rather high temperatures are to be applied in order to induce the necessary spontaneous decomposition, but at these temperatures the primarily formed substituted N-sulphanilyl ureas decompose on their part, for example under formation of isocyanates and their decomposition products, respectively. Therefore, this method is not generally practicable for the manufacturing of N-sulphanilyl ureas in a pure state, the more so as the strongly acid sulphanilyl urethanes and the likewise considerably acid sulphanilyl ureas will form difficultly separable mixtures.

It is an object of our invention to provide a new technical process of manufacturing the important N-sulphanilyl ureas of the general formula

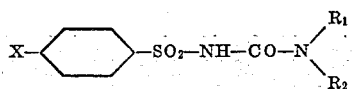

wherein X is an amino group or a residue convertible to such a group in a usual manner, and $R_1$ and $R_2$ are hydrogen or unsubstituted or substituted alkyl, aralkyl, aryl or heterocyclic residues. By this process, the disadvantages connected to the methods hitherto used in this field are avoided, and generally good yields, in many cases practically quantitative ones, are obtained. Another object of our invention is the preparing of new and useful N-sulphanilyl ureas by this process, these compounds being only difficultly available by any of the methods hitherto known. Further objects will appear from the following description.

One fundamental basis of our invention is the discovery that N-sulphanilyl compounds will undergo decomposition to undesired by-products by far more seldom if they are handled in solid state. A crystallized sulphanilyl urea, for instance, endures without harm temperatures up to its melting point, which in most cases is above 140–150°, whereas it is rapidly decomposed to products of the cyanic acid-polymerisation and sulphonamides at the same temperatures when dissolved. Another observation being important for the present invention is the fact that the sulphanilyl compounds, which may be used as starting materials for our process (as described in the following), form with amines

salts or addition products of relatively low solubility, which on heating decompose in interchanging the residue

to the desired N-sulphanilyl ureas.

Hence, in consideration of these facts the process of our invention consists in reacting sulphanilyl compounds of the general formula

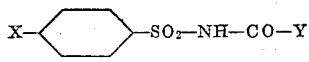

where X has the aforesaid signification and Y is an alkoxy, mercaptyl, acylamido or a sulphanilyl group, respectively, with amines

($R_1$ and $R_2$ as above), isolating the formed salts or addition products and heating same in solid state. The reaction products may be saponified subsequently in the usual manner (X=NH$_2$).

Thus, there are four groups of sulphanilyl compounds, which are especially suitable for the salification and the further steps of our process: N-sulphanilyl urethanes, $N_1$-sulphanilyl $N_2$-acyl ureas, N-sulphanilyl-monothiourethanes and $N_1$-$N_2$-disulphanilyl ureas. Heating the amine salts of such sulphanilyl compounds, there will arise by interaction (as will be understood without further explanation by those skilled in the art and as will be demonstrated in particular in the following examples) besides the desired N-sulphanilyl urea an alcohol, an acylamide, a mercaptane and a sulphonamide, respectively. These by-products are neutral substances which are inert as to the reactions in question or may be continually removed during same by simple means, respectively; no side reactions interfering therefore, as it is generally the case with the hitherto employed methods of preparing N-sulphanilyl ureas as mentioned above. It must be understood, that only such sulphanilyl compounds are suitable for our process which have in p-position an inert residue, f.i. an acetylamino or nitro group, being easily convertible by the usual methods to the free aromatic amino group, because the latter in most cases may react during the subsequent thermic decomposition of the amine salts.

For the preparation of the amine salts being intermediates of our process may serve practically all amines

thus enabling introducing without limitation all residues $R_1$ and $R_2$ into the sulphanilyl urea molecule. The formation of the amine salts or addition products may be prepared according to any methods known for the manufacturing of organic salts or addition products (as such compounds may also be called); particulars will appear from the following examples. These intermediates are obtained without difficulty in an absolutely pure state thus enabling eliminating the undesired impurities adhering usually to the sulphanilyl compounds as well as to the amines to be started from. This fact is another reason, why N-sulphanilyl ureas are obtained with better yields or have become available when employing our process instead of the hitherto known methods cited above.

The thermic decomposition of the amine salts or addition products with N-sulphanilyl urethanes, $N_1$-sulphanilyl $N_2$-acyl ureas, N-sulphanilyl monothiourethanes and $N_1$-$N_2$-disulphanilyl ureas, respectively, may be effected without any medium of heat-transmission, i.e. by stirring in a suitably heated vessel. However, there may also be employed an inert suspension medium, which practically doesn't dissolve the salt and the sulphanilyl urea being formed. Such suspension media are, for example, hydrocarbons, halogenated hydrocarbons etc. The heating may be carried out under atmospheric pressure, in open vessels as well as in an indifferent gas, or, in many cases perferably, in a more or less high vacuum. The temperatures to be employed depend on these external conditions as well as on the substances to be reacted; thus, they may vary within a rather wide range. The optimal conditions for the case in question are easily to be ascertained, the aim being on the one side to obtain a reacting as quantitative as possible of the amine salts or additions products, and to avoid undesired decomposition of matter on the other side. Furthermore, the choice of the conditions depends on other circumstances: thus, the continual removal of a volatile reaction product, f.i. alcohol, may be advisable in order to favorise the expiration of the reaction, which otherwise might turn to the opposite direction with the result of an equilibrium.

By the process of our invention, not only $N_1$-sulphanilyl ureas which have already been described in literature may be manufactured in far better yields than by any other methods hitherto known, but many new ones have practically become available for the first time. Such hitherto unknown N-sulphanilyl ureas are often more useful than the known ones because of their greater activity and/or better compatibility to the human body. This is especially the case with N-sulphanilyl ureas

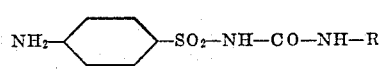

wherein R is an alkyl, alkenyl or alkinyl residue, respectively, with 3 or 4 carbon atoms. It is, therefore another important object of our invention to prepare such derivatives as $N_1$-sulphanilyl $N_2$-propyl urea, $N_1$-sulphanilyl $N_2$-isopropyl urea, $N_1$-sulphanilyl $N_2$-butyl urea, $N_1$-sulphanilyl $N_2$-allyl urea and so on.

Our invention will now be described by way of the following examples, without being limited thereto.

Example 1

47.1 g. of the ammonia salt of the di-(acetyl sulphanilyl) urea (prepared by reacting the sodium salt of acetyl sulphonamide with diphenylcarbonate and dissolving the obtained reaction product in concentrated aqueous ammonia) are heated, while stirring, at an oilbath-temperature of 140° C. until a test-portion, shaken with the tenfold quantity of water and filtered off from the insoluble part, gives no longer any precipitate of di-(acetyl sulphanilyl) urea. As soon as this point is obtained, the mass is cooled down, whereupon the tenfold quantity of water and so much sodium hydroxide, while stirring, are added until a pH of 8,8 is reached. Thus the whole of the formed N-(acetyl sulphanilyl) urea is dissolved, whereas the sulphonamide being formed as a by-product remains practically undissolved. After filtering and acidifying the filtrate, until a pH of 2 is obtained, acetyl sulphanilyl urea crystallizes in fine needles, which are filtered off by suction, washed with water and dried at 50° C. Yield 23.3 g. (90%); titrated mol-weight 259 (theoretical 257).

The product is saponified at 60° C. by means of 2.5 mol of aqueous NaOH, until a test-portion is completely soluble in 5% hydrochloric acid. One neutralizes then with methyl orange as indicator, whereupon sulphanilyl urea crystallizes in colorless, thin leaflets, which are filtered off by suction, washed with water and dried at 40° C. Yield 18.7 g.; titrated mol-weight 233 (theor. 217, or 233 with 1 mol of water). The crystal water escapes on drying at 60–70° C., and one obtains thus a white powder.

The acetyl sulphonamide, obtained during the process as a by-product, may be returned to the process.

Example 2

The granular, crystallized methylamine salt of di-(acetyl-sulphanilyl) urea is produced from a 40% aqueous methylamine solution of the crude starting material; the mother lye, containing still certain quantity of the salt may be used for the next charge after having been regenerated with fresh methylamine. In this manner a practically quantitative yield of pure, colorless amine salt is obtained.

48.5 g. of this salt are heated in a drying chamber to 110–140° C. until the whole quantity is converted. This may be proved by examining a small portion with regard to soluble parts, which on acidifying yield di-(acetyl sulphanilyl) urea. As soon as this test is negative, the heating is interrupted. The obtained N-(acetyl sulphanilyl) methyl urea is separated from the likewise formed acetyl sulphonamide by shaking the mass with a solution of sodium bicarbonate, wherein the urea derivative is soluble and the sulphonamide is unsoluble. After filtering the solution is acidified to congo reaction. Yield 27 g.; the mol-weight on titration with sodium hydroxide is 270 (theor. 257). The product is of 95% purity, and the yield is therefore 95% of the theory.

The crude product is saponified without further purification with 2.5 mol sodium hydroxide at a temperature of 70°. After neutralising up to pH 4 one obtains sulphanilyl methyl urea; yield 19.5 g. (85%). After recrystallisation from methanol colorless crystals are obtained having a melting point of 173° C. and a titrated mol-weight of 229.5 (theor. 229).

In the same manner there are obtained from 49.9 g. of the ethylamine salt of the di-(acetylamino benzene sulphonyl) urea about 80% of $N_1$-sulphanilyl $N_2$-ethyl urea with a melting point of 160° and of the titrated mol-weight of 243 (theor. 243).

Example 3

By adding crude di-(p-methylcarbamido benzene sulphonyl) urea, obtained from diphenyl carbonate and the methylurethane of sulphonamide to an aqueous solution of 30% n-propylamine there is obtained the crystallized salt, the yield of which may be made a practical one by re-utilising the mother liquor after having been regenerated with fresh propylamine.

54.5 g. of this salt are heated in an air bath of about 140° C., while stirring. The end of the reaction is established by the determination of the still soluble part of undecomposed salt, as above described. Hereafter one works up as described in Example 2. The precipitated crude (p-methylcarbamido benzene sulphonyl) propyl urea is added to a concentrated solution of sodium hydroxide at 70° C. (2.5 mol calculated on the used salt), until the product has become completely soluble in hydrochloric acid. The solution is diluted with water and treated with charcoal, whereupon the pure filtrate is precipitated by neutralising it with hydrochloric acid up to pH 4. The obtained sulphanilyl n-propyl urea, which has not been described in literature until now, is recrystallized from 80% ethanol; heating must be avoided. The pure product has a melting point of 141° and a titrated mol-weight of 257 (theor. 257); yield 75%.

In the same manner the hitherto unknown sulphanilyl isopropyl urea of the melting point 131° C. may be obtained.

In analogous procedures the following new compounds are containable:

$N_1$-(p-aminobenzene sulphonyl) $N_2$-allyl urea___ 109° F.
$N_1$-(p-aminobenzene sulphonyl) $N_2$-n-butyl urea _____ 141/142° F.

Also the correspondent secondary butyl-, isopropyl-, isoamyl-, N-hexyl-, cyclohexyl-, as well as the crotyl compounds may be easily prepared in the same manner. With the higher amines, however, the lower solubility of the amine salts in water must be considered; it is better to start in these cases from less concentrated amine solutions in order to get pure products.

Example 4

40.6 g. of the benzylamine salt of $N_1$-(acetyl sulphanilyl) $N_2$-acetyl urea (obtained by reacting the sodium salt of acetyl sulphonamide with N-acetyl urethane) are heated in a drying chamber up to 150°, until no more soluble benzylamine salt is present in the mass. Now heating is interrupted and the reaction product suspended with 20 parts of water, whereby the formed acetamide and small quantities of impurities are dissolved. The crude acetylsulphanilyl benzyl urea is filtered and washed with water. On saponification with 2.5 mol NaOH in aqueous solution at 70°, precipitation by hydrochloric acid at pH 4, and recrystallisation of the precipitate from 80% ethanol one obtains the pure sulphanilyl benzyl urea a melting point of 199–200° and mol-weight 305; yield 80%.

In the same manner the $N_1$-sulphanilyl $N_2$-phenylethyl urea may be produced by means of phenylethyl amine and $N_1$-sulphanilyl $N_2$-(3,4-dimethoxy-phenylethyl) urea by means of homoveratryl amine.

Instead of the $N_1$-(p-acetylamino benzene sulphonyl) $N_2$-acetyl urea there may be used with the same result the correspondent $N_2$-isovalerianyl urea, obtained from the sodium salt of acetylsulphonamide and isovalerianyl urethane.

Example 5

The salt which is formed by shaking 45.4 g. of di-(acetyl sulphanilyl) urea and 9.3 g. aniline in 50% alcohol and evaporating the alcohol in vacuo is suspended in the threefold quantity of neutral paraffin-oil, and the mass is heated up to 150° for about three hours while stirring. After cooling down the reaction mixture is diluted with the same quantity of petrol ether. The precipitate is filtered by suction and washed with petrol ether. The dried mass, which consists of (acetyl sulphanilyl) phenyl urea and acetyl sulphonamide in equal parts, is suspended in the fortyfold quantity of water, whereupon exactly 1 mol of caustic soda lye is added, The stirring is continued until nothing more is dissolved. Then the undissolved acetyl sulphonamide is filtered off by suction. The solution is made congo acid, and the thus obtained precipitate is saponified with 2.5 mol of sodium hydroxide at 70–80° C. By adding hydrochloric acid to the mixture up to pH 4, one obtains 23 g. (79%) of $N_1$-sulphanilyl $N_2$-phenyl urea, which after the crystallisation from 80% alcohol forms colorless crystals; M.P. 171°, titrated mol-weight 293–294 (calc. 291).

Instead of the paraffin-oil there may be used other indifferent media, for instance monochlorbenzene, dichlorbenzene, xylene, anisol, nitrobenzene etc.

Example 6

33.1 g. of the propyl amine salt of acetyl sulphanilyl methyl urethane are heated in a round flask, which is equipped with a stirrer, an efficient reflux-cooler and an ice-cooled recipient-vessel in water-jet vacuo up to 130–140°. As soon as the reaction temperature is reached, methanol is formed which partially condenses in the deep-cooled recipient-vessel. The reaction is finished as soon as no more methanol is split off. Then the mass is cooled and a solid residue of $N_1$-acetylsulphanilyl $N_2$-propyl urea without any by-products is obtained, which is only adulterated by small quantities of acetyl sulphonamide formed by decomposition. The product is saponified without further purification with 2.5 mol of caustic soda lye and the $N_1$-sulphanilyl $N_2$-propyl urea is precipitated from the mixture by means of hydrochloric acid at pH 4. Yield of the crude product 23 g. (90% of the theory). In the same manner also the methyl, ethyl, isopropyl and allyl compounds are easily available (s. Example 3).

Example 7

The salt which is obtained from 28.6 g. of acetylsulphanilyl ethyl urethane and 12.8 g. of p-chloraniline in 100 ccm. of monochlorbenzene results at the beginning as a viscous oil, but after some standing and stirring it crystallizes to a solid and practically pure mass. It is heated in chlorbenzene as suspension medium till boiling while vigorously stirring. (Instead of monochlorbenzene, dichlorbenzene or paraffin-oil may be used with the same effect.) By means of a short column with a connected cooler the formed ethyl alcohol is distilled off. If the quantity of the distillate doesn't increase any more (some hours), the reaction is interrupted. The mass is cooled down and then 500 ccm. of water and 4.5 g. of sodium hydroxide in the form of a 30% caustic soda solution are added while stirring until the whole is dissolved. Then the chlorbenzene is separated and additional 7 g. of sodium hydroxide are added to the aqueous solution. The mixture is heated until a test portion is completely soluble in n-HCl. Hereinafter the product is precipitated with hydrochloric acid at pH 4. During this process the crude sulphanilyl p-chlorphenyl urea precipitates in the form of a rapidly solidifying oil. The mass is sucked off, washed and dried; yield 26 g. (80%). The product is recrystallized from alcohol or purified over its chlorhydrate being of low solubility. Titrated mol-weight 239 (theor. 326).

In the same way the reaction may be carried out with xylidines, anisidines and other aromatic amines.

Example 8

From aminoethanol and acetylsulphanilyl ethyl urethane the crystallized salt is prepared in a solution as concentrated as possible. In case the mixture should not crystallize at once, it must be allowed to stand for some time, until formation of the crystal nucleus has taken place. The mass is then separated from the mother-liquor and washed with acetone.

34.7 g. of the crystallized salt are heated gradually up to 130–145° in vacuo, whereby the separated alcohol is collected by a cooler and a cooled recipient-vessel. As soon as the alcohol is completely split off, heating is stopped at once and the mass is cooled. The obtained crude acetylsulphanilyl β-oxyethyl urea is saponified with 2.5 mol of caustic soda solution and the reaction product is precipitated from the saponification solution by hydrochloric acid at pH 4; yield 18.7 g. (70%) of crude sulphanilyl β-oxyethyl urea are obtained. The sodium salt of this compound melts above 200° C. Titrated mol-weight (with 1/10 n-sodium nitrite solution and drop-test for the determination of the amino group)=290 (calculated 289).

In the same manner one may also start from β-ethoxy ethyl amine and β-dimethylamino ethyl amine.

Example 9

Of acetylsulphanilyl methyl urethane and α-aminopyridine there is prepared in a concentrated aqueous solution the comparatively difficulty soluble salt. 36.6 g. of this salt are gradually heated in vacuo up to 130–145°, taking care by vigorous stirring that the substance does not agglomerate. When the splitting off of the methanol is finished, the substance is cooled and the formed crude acetylsulphanilyl compound is saponified by means of caustic soda solution. The sulphanilyl pyridyl carbamide is obtained in a 80% yield and may be purified over its sodium salt; mol-weight 316 (calculated 314).

In the same manner it is possible to convert other pyridine amines and pyrimidine amines, f.i. the 2-ethoxy 5-amino pyridine, the 2-amino pyrimidine and the 6-amino 2,4-dimethyl pyrimidine into the corresponding compounds. The reaction with 4-amino pyrimidine is also possible, but somewhat more difficultly and with lower yields.

Example 10

N-(p-acetylaminobenzene sulphonyl) phenyl urethane is produced as follows: 20 g. of chlorcarbonic acid phenyl ester are added to 21.5 g. of acetyl sulphonamide and 35 g. of dry potassium carbonate in 120 ccm. of dry acetone while stirring, and the mixture is heated to boiling for 15 hours under exclusion of humidity. After cooling and filtering by suction the solid residue is dissolved in 350 ccm. of water, the solution treated with charcoal and precipitated with concentrated HCl until congo-acidity. After having been allowed to stand for some time the primarily precipitated oil has become solid. The reaction product is sucked off, washed with water and dried in vacuo: yield 26 g.; mol-weight titrated with NaOH 326 (calc. 334).

26 g. of this crude product are pulverised and added to a solution of 15 g. n-propyl amine in 50 ccm. of water while stirring. After initial dissolution the propyl amine salt crystallises in a practically quantitative yield. The product is sucked off, washed with free propyl amine solution and dried.

The solid salt is heated in monochlorbenzene up to 100°, until the formation of acetylsulphanilyl n-propyl urea is practically terminated. The saponification of the crude product with 3 mol NaOH gives a very good yield of $N_1$-sulphanilyl $N_2$-n-propyl urea with the correct melting point of 141° (see Example 3).

What we claim is:

1. In the process of producing sulfanilyl urea compounds of the formula

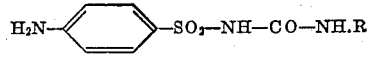

wherein R is an alkyl radical with 3 to 4 carbon atoms, the step comprising heating the amine addition salt of an amine of the formula

wherein R represents said same member as indicated above, with a sulfanilyl compound of the formula

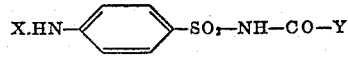

wherein X is a member selected from the group consisting of a carbo-(lower) alkoxy group and a lower alkanoyl group and Y is a member selected from the group consisting of a lower alkoxy group and the sulfanilyl amido group of the formula

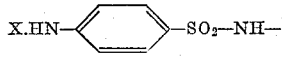

wherein X represents the same member as indicated above, in the solid state to a temperature between about 110° C. and about 150° C. until the amine addition salt is substantially completely converted into the sulfanilyl urea compound of the formula

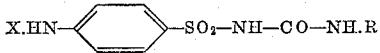

wherein X and R represent the same members as indicated above and converting, by the action of a hydrolyzing agent, the X.NH- group into the free amino group.

2. In the process of producing $N_1$-(p-amino benzene sulfonyl)-$N_2$-(n-propyl) urea, the steps comprising heating the n-propylamine salt of di-(p-methyl carbaminyl benzene sulfonyl) urea in the solid state to a temperature of about 140° C., while stirring, until said n-propylamine addition salt is substantially completely converted into $N_1$-(p-methyl carbaminyl benzene sulfonyl)-$N_2$-(n-propyl) urea and converting, by the action of a hydrolyzing agent, the methyl carbaminyl group into the free amino group.

3. In the process of producing $N_1$-(p-amino benzene sulfonyl)-$N_2$-(n-propyl) urea, the steps comprising heating the n-propylamine salt of acetyl sulfanilyl methyl urethane in the solid state to a temperature between about 130° C. and about 140° C., while stirring, until no more methanol is split off and converting, by the action of a hydrolyzing agent, the acetyl amino group into the free amino group.

4. In the process of producing $N_1$-(p-amino benzene sulfonyl)-$N_2$-(n-butyl) urea, the steps comprising heating the n-butylamine salt of di-(p-methyl carbaminyl benzene sulfonyl) urea in the solid state to a temperature of about 140° C., while stirring, until said n-butylamine addition salt is substantially completely converted into $N_1$-(p-methyl carbaminyl benzene sulfonyl)-$N_2$-(n-butyl) urea and converting, by the action of a hydrolyzing agent, the methyl carbaminyl group into the free amino group.

References Cited in the file of this patent

UNITED STATES PATENTS

| | | |
|---|---|---|
| 2,312,404 | Haack | Mar. 2, 1943 |
| 2,371,178 | Martin et al. | Mar. 13, 1945 |
| 2,385,571 | Haack | Sept. 25, 1949 |

FOREIGN PATENTS

| | | |
|---|---|---|
| 215,241 | Switzerland | Sept. 1, 1941 |
| 220,970 | Switzerland | Aug. 1, 1942 |
| 220,971 | Switzerland | Aug. 1, 1942 |
| 227,924 | Switzerland | Sept. 16, 1943 |
| 233,109 | Switzerland | Oct. 2, 1944 |
| 233,110 | Switzerland | Oct. 2, 1944 |
| 233,367 | Switzerland | Nov. 1, 1944 |
| 267,635 | Switzerland | July 17, 1950 |
| 162,888 | Austria | Apr. 25, 1949 |
| 162,955 | Austria | Apr. 25, 1949 |
| 71,236 | Norway | Nov. 4, 1946 |

OTHER REFERENCES

Basterfield et al.: J. Am. Chem. Soc., vol. 49, pp. 2942–8 (1927).